H. G. SLINGLUFF.
GLASS DRAWING APPARATUS.
APPLICATION FILED JAN. 28, 1908.
1,141,497.
Patented June 1, 1915.
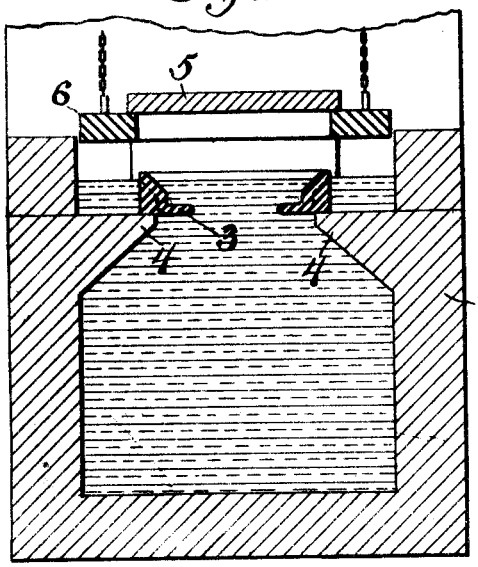
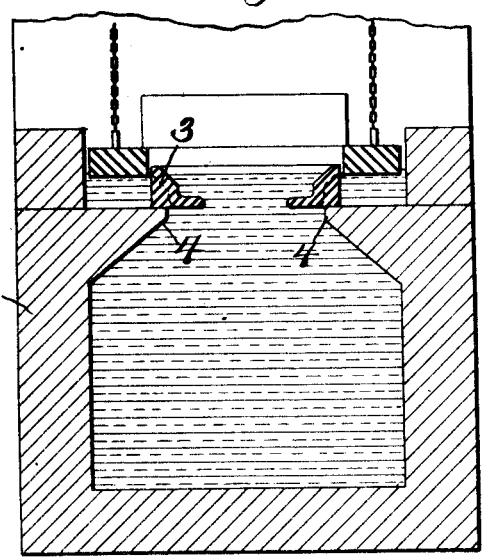
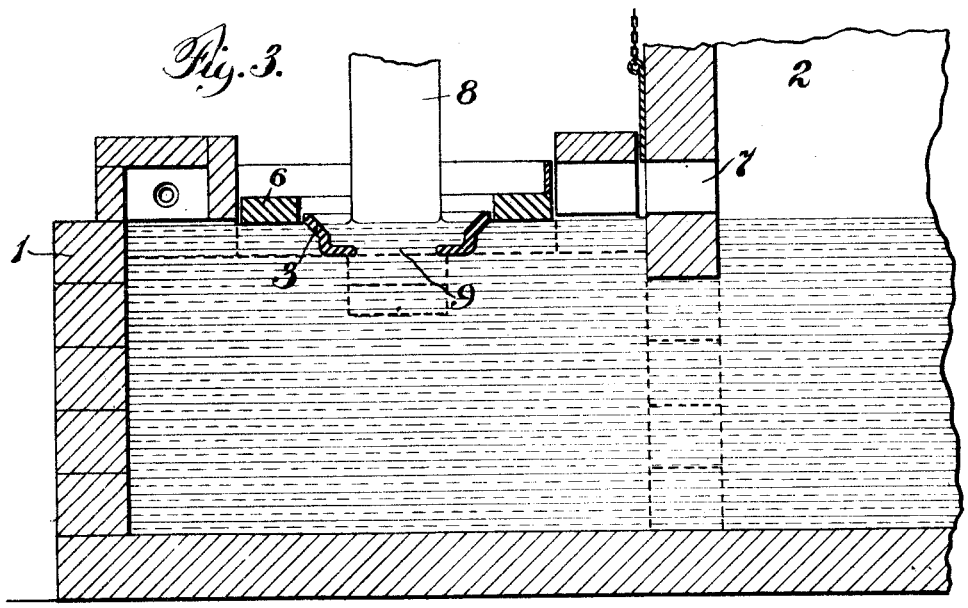
WITNESSES
Harvey L. Lechner
J. C. Bradley
INVENTOR
Harry G. Slingluff
by atty
Paul Synnestvedt

UNITED STATES PATENT OFFICE.

HARRY G. SLINGLUFF, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

GLASS-DRAWING APPARATUS.

1,141,497.  Specification of Letters Patent.  Patented June 1, 1915.

Application filed January 28, 1908. Serial No. 413,002.

*To all whom it may concern:*

Be it known that I, HARRY G. SLINGLUFF, a citizen of the United States, residing at Pittsburgh, in the county of Allegheny and State of Pennsylvania, have invented certain new and useful Improvements in Glass-Drawing Apparatus, of which the following is a specification.

The invention relates to glass drawing apparatus and particularly to the apparatus from which cylinders for the making of window glass are drawn. The invention has for its principal objects; the provision of means whereby a cylinder of requisite thickness may be drawn directly from a large deep body of glass; and the provision of apparatus whereby movement or creeping of the cylinder on the surface of the molten mass from which it is drawn and distortion thereof are avoided. One embodiment of the invention is illustrated in the accompanying drawing, wherein:—

Figure 1 is a transverse section through the end of the drawing tank, the cover or hood being raised to permit reheating of the surface of the glass in the tank, Figure 2 is a section similar to that of Figure 1, but with the supporting cover ring lowered and the cover removed for drawing, Figure 3 is a section through the melting and drawing tanks taken at right angles to that of Figures 1 and 2, and shows the cylinder in process of drawing, and Figure 4 is a transverse section through the drawing receptacle.

Heretofore when the drawing of cylinders has been attempted directly from a melting tank or an extension thereof containing a considerable body of glass, difficulty has been experienced in securing a cylinder of sufficient thickness, due to the too great fluidity of the glass at the surface of the mass, which fluidity results from the high temperature which must be maintained in the main body of the glass. My apparatus is designed to overcome this difficulty by the provision of means for separating a portion of the surface of the glass to be drawn from the body of the glass beneath, while at the same time maintaining communication with such body of glass. This arrangement permits the temperature of the surface glass to fall sufficiently below that of the body of the glass to give a proper viscosity for the production of a cylinder of requisite thickness. Another difficulty experienced heretofore in drawing directly from a large body of glass has been due to the tendency of the glass on occasion to creep over the surface of the mass, and to draw unequally as a result of the difference in temperature existing at different portions of the surface of the glass, such difference in temperature tending to cause the glass to blow out unevenly, thereby producing a cylinder of unequal thickness and of small commercial value. My apparatus is designed to overcome this difficulty by the provision of a drawing receptacle which is so constructed as to maintain the cylinder concentric with the drawing receptacle regardless of slight unevenness in temperature at different portions of the surface of the glass.

Referring to the embodiment of the invention as illustrated in the drawing, 1 is the drawing tank communicating with the melting tank 2 as illustrated in Figures 3, 3 is the drawing receptacle, 4 are a pair of projections upon which the drawing receptacle is adapted to rest, 5 is the cover or hood which is removed when the drawing occurs, 6 is the top stone for carrying the hood, which stone is adapted to be moved up and down by means of the chains shown, 7 is a flue between the melting furnace and the drawing furnace and 8 is a cylinder in process of drawing (Figure 3). The bottom of the receptacle 3 is provided with an aperture 9 and the edges of such receptacle are inclined outwardly so that when the parts are in the position shown in Figure 3, the edges of the receptacle approach the top stone 6 and project slightly above the surface of the glass.

The foregoing apparatus provides for the separation and consequent cooling of the body of glass lying inside the receptacle, thus reducing the fluidity of such material in the receptacle, and permitting the drawing of a cylinder of greater thickness than has heretofore been possible where the body of glass from which the cylinder was drawn was in communication with the body of glass at a very high temperature lying beneath the point of drawing. The arrangement permits of just sufficient reduction in temperature of the glass in the receptacle to give proper drawing, and at the same time the aperture in the bottom of the receptacle permits of a replenishing of the glass from the body of glass beneath the receptacle. Another important function of the construction, is the maintenance of the cylinder throughout the drawing in the position from which the draw was started, which mode of operation insured a cylinder of uniform thickness. In the practice of the invention with this apparatus it has been found that the cylinder maintains itself exactly concentric with the opening '9 throughout the draw. This function seems to be due to the fact that the glass over the center of the opening 9 is very fluid, due to its direct and immediate communication with the hot body of fluid directly beneath, and to the fact that the glass in the receptacle outside of the opening 9 is much less fluid because of its lower temperature, so that if any portion of the surface of the glass in the receptacle has an unduly high temperature, which would tend to cause the cylinder to spread in that direction to a greater extent than it should as the drawing progresses, such spreading will be checked when the edge of the cylinder passes beyond the edge of the opening 9 because of the increasing thickness or viscosity of the material, and there will be no expansion or movement outward of any portion of the base of the cylinder beyond a predetermined limit. This effect is further augmented by the inclining of the edges of the receptacle which reduces the volume of the glass in the receptacle and consequently the temperature as the edges thereof are approached.

Having thus described my invention and illustrated its use, what I claim as new and desire to secure by Letters Patent is the following:—

In apparatus for drawing glass cylinders, the combination with a tank, of a drawing member with an opening therethrough lying partially submerged in and surrounded by the glass of the tank with the upper edge lying above the surface of the glass, the opening through the said drawing member being larger at the top than at the bottom with the edge of the portion of least diameter projecting beneath the edge of the cylinder being drawn, whereby the glass in the drawing member is partially segregated from the glass in the tank beneath the drawing member.

In testimony whereof I have hereunto signed my name in the presence of the two subscribed witnesses.

HARRY G. SLINGLUFF.

Witnesses:
PAUL SYNNESVEDT,
J. C. BRADLEY.